United States Patent
Gautrot et al.

(10) Patent No.: US 11,578,644 B2
(45) Date of Patent: Feb. 14, 2023

(54) GAS INTAKE DEVICE HAVING TWO ASYMMETRICAL INTAKE DUCTS

(71) Applicant: IFP Energies nouvelles, Rueil-Malmaison (FR)

(72) Inventors: Xavier Gautrot, Rueil-Malmaison (FR); Julien Trost, Rueil-Malmaison (FR); Martin Ritter, Rueil-Malmaison (FR); Arnaud Krieger, Rueil-Malmaison (FR); Sebastien Charmasson, Rueil-Malmaison (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 0 days.

(21) Appl. No.: 17/442,657

(22) PCT Filed: Mar. 26, 2020

(86) PCT No.: PCT/EP2020/058559
§ 371 (c)(1),
(2) Date: Sep. 24, 2021

(87) PCT Pub. No.: WO2020/212112
PCT Pub. Date: Oct. 22, 2020

(65) Prior Publication Data
US 2022/0170412 A1    Jun. 2, 2022

(30) Foreign Application Priority Data

Apr. 16, 2019 (FR) ..................... 1904026

(51) Int. Cl.
*F02B 31/08* (2006.01)
*F02F 1/42* (2006.01)

(52) U.S. Cl.
CPC ............... *F02B 31/08* (2013.01); *F02F 1/42* (2013.01)

(58) Field of Classification Search
CPC ......... F02D 2041/0015; F02D 41/0002; F02D 9/02; F02D 9/101; F02B 2023/106; F02B 2275/48; F02M 35/10; F02M 35/10072
See application file for complete search history.

(56) References Cited

U.S. PATENT DOCUMENTS

| 5,056,486 A |   | 10/1991 | Johannes |   |
|---|---|---|---|---|
| 5,174,260 A | * | 12/1992 | Nonogawa | ............ F01L 1/265 123/188.8 |

(Continued)

FOREIGN PATENT DOCUMENTS

| AT |   | 283 U1 | 7/1995 |
|---|---|---|---|
| DE |   | 10128500 C1 | 2/2003 |

(Continued)

*Primary Examiner* — Long T Tran
(74) *Attorney, Agent, or Firm* — Fitch, Even, Tabin & Flannery, LLP

(57) ABSTRACT

The present invention relates to a gas intake device (1) for a cylinder of an internal-combustion engine. The gas intake device comprises two intake pipes (5a, 5b), two intake valves (4), two intake valve calibration parts (6a, 6b) and, in each intake pipe (5a, 5b), means for forming an aerodynamic gas motion of tumble type in the cylinder. Furthermore, for each intake pipe (5a, 5b), the intersection between intake pipe (5a, 5b) and calibration part (6a, 6b) occurs along a line non-parallel to the plane of the fire face. Besides, the inclination angle of this intersection is different for each pipe (5a, 5b).

13 Claims, 5 Drawing Sheets

(56) References Cited

U.S. PATENT DOCUMENTS

| | | | | |
|---|---|---|---|---|
| 5,551,393 A * | 9/1996 | Amano | ............... | F02B 31/04 |
| | | | | 123/193.5 |
| 5,551,394 A * | 9/1996 | Yoshikawa | ........... | F02B 31/087 |
| | | | | 123/308 |
| 5,927,246 A * | 7/1999 | Occella | ............... | F02F 1/4214 |
| | | | | 123/302 |
| 6,606,975 B1 | 8/2003 | Caliskan et al. | | |
| 7,077,102 B1 * | 7/2006 | Stowe | ............... | F02B 31/00 |
| | | | | 123/308 |
| 2002/0112693 A1 * | 8/2002 | Stutz | ............... | F02B 31/04 |
| | | | | 123/188.14 |
| 2004/0159300 A1 * | 8/2004 | Stuetz | ............... | F02M 35/1085 |
| | | | | 123/188.14 |
| 2008/0149063 A1 | 6/2008 | Denger et al. | | |
| 2009/0120399 A1 * | 5/2009 | Sato | ............... | F02F 1/4228 |
| | | | | 123/188.14 |
| 2009/0223476 A1 * | 9/2009 | Shinkai | ............... | F02M 26/12 |
| | | | | 123/184.21 |
| 2011/0174279 A1 * | 7/2011 | Ito | ............... | F02M 26/20 |
| | | | | 123/568.18 |
| 2011/0214640 A1 * | 9/2011 | Chang | ............... | F02B 31/00 |
| | | | | 123/184.59 |
| 2012/0160198 A1 | 6/2012 | Durando et al. | | |
| 2016/0281633 A1 * | 9/2016 | Nakahara | ............... | F02B 37/00 |

FOREIGN PATENT DOCUMENTS

| | | |
|---|---|---|
| DE | 102017112350 A1 | 12/2018 |
| EP | 0537745 A1 | 4/1993 |
| EP | 1783341 A1 | 5/2007 |
| JP | 2010261314 A | 11/2010 |
| WO | 2015/033198 A1 | 3/2015 |

\* cited by examiner

[Fig 1]
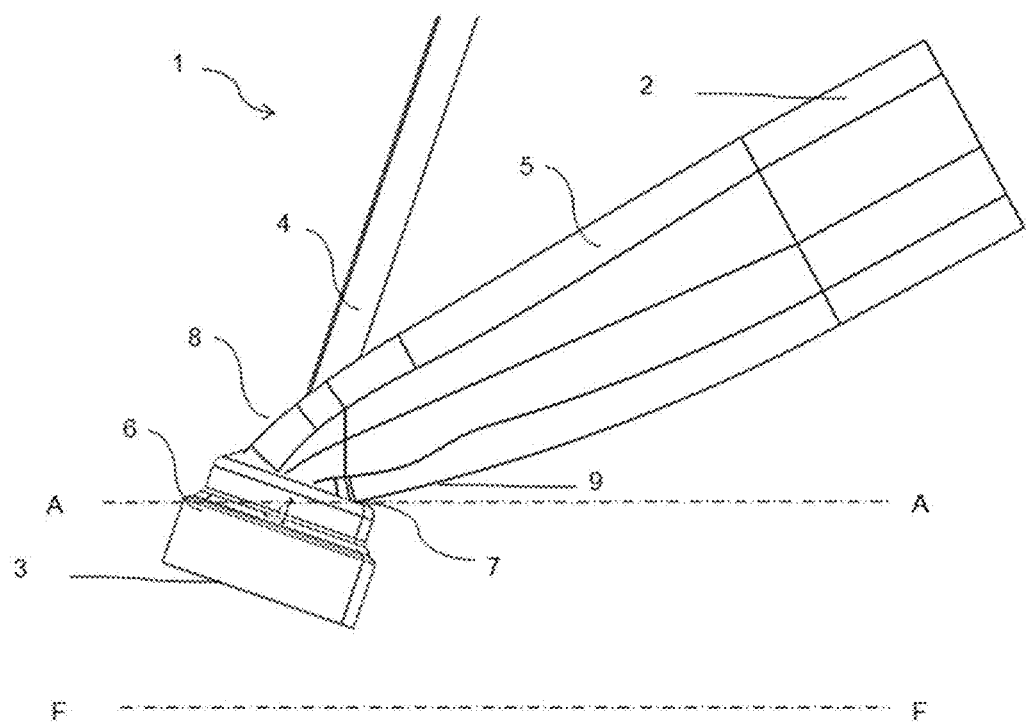
[Fig 2]
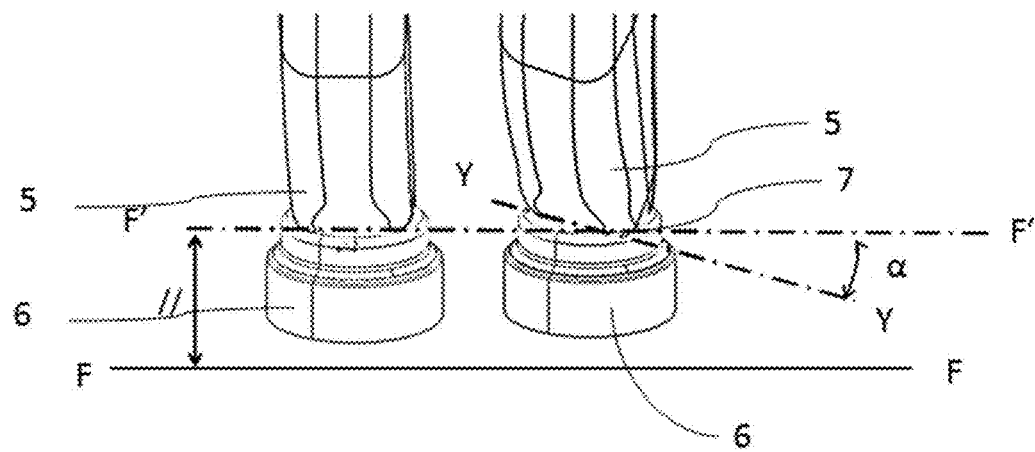

[Fig 3]
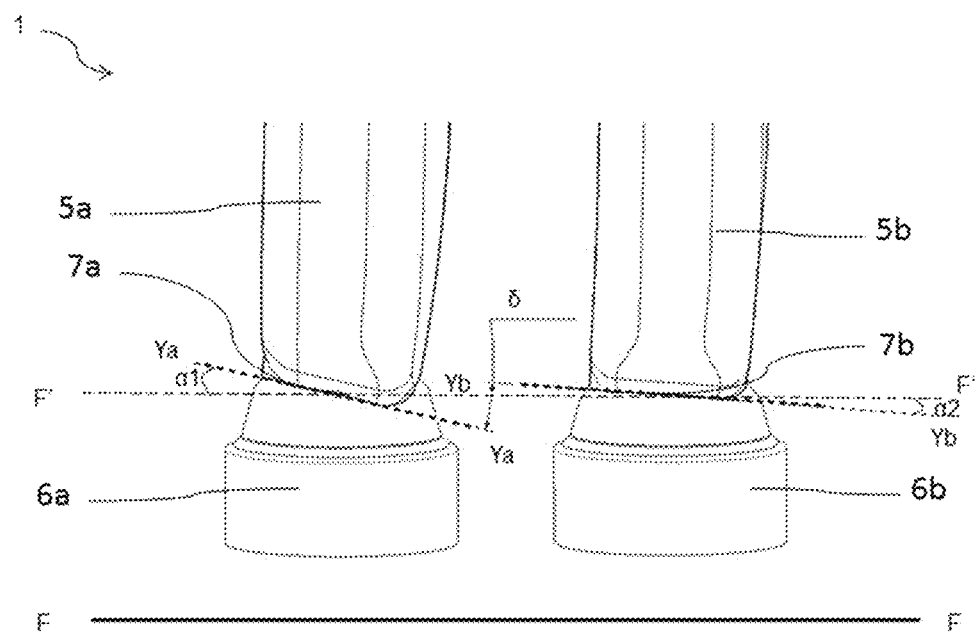

[Fig 4]
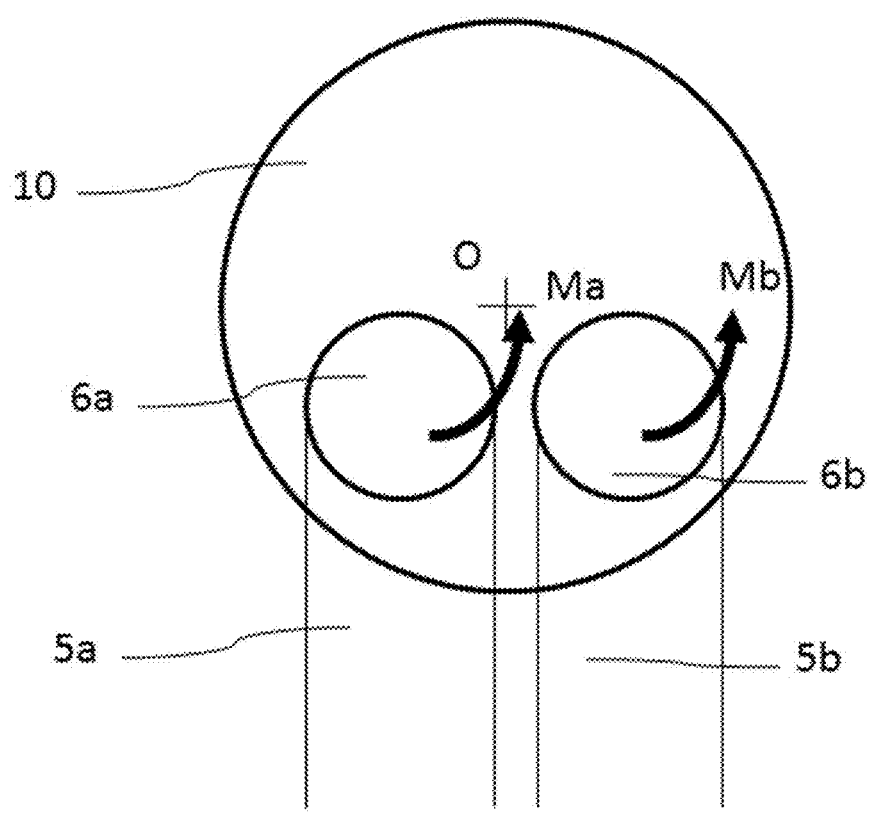

[Fig 5]
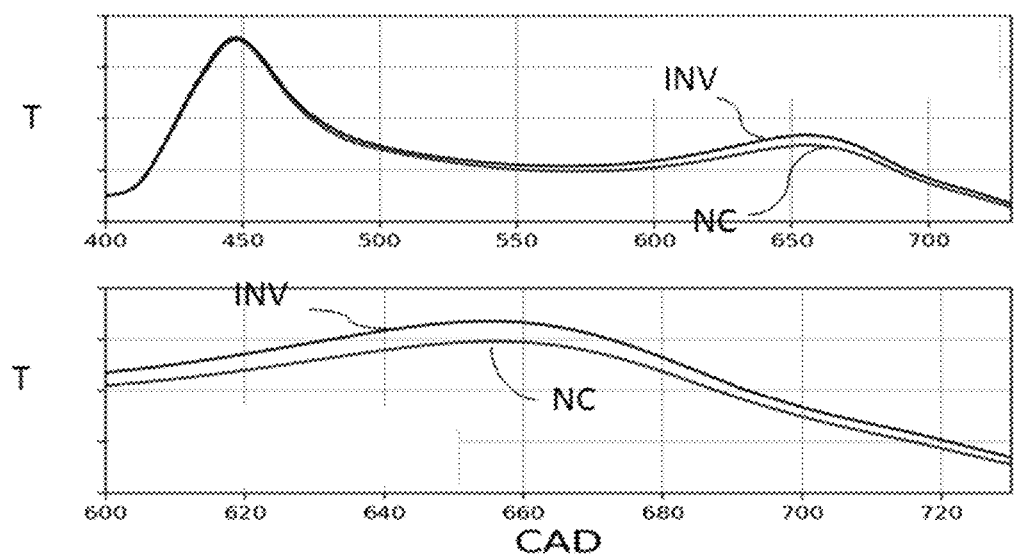
[Fig 6]
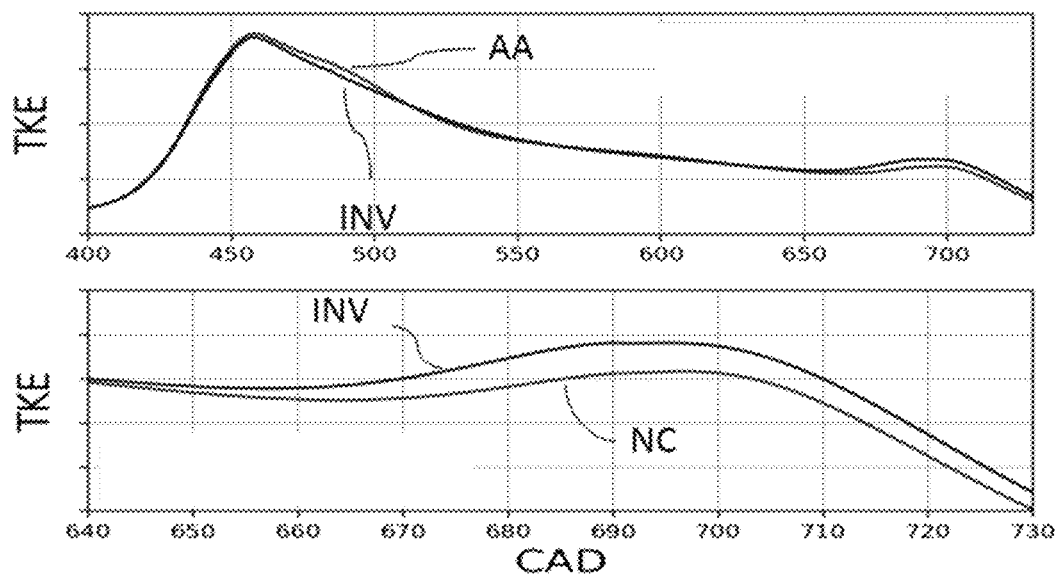

[Fig 7]
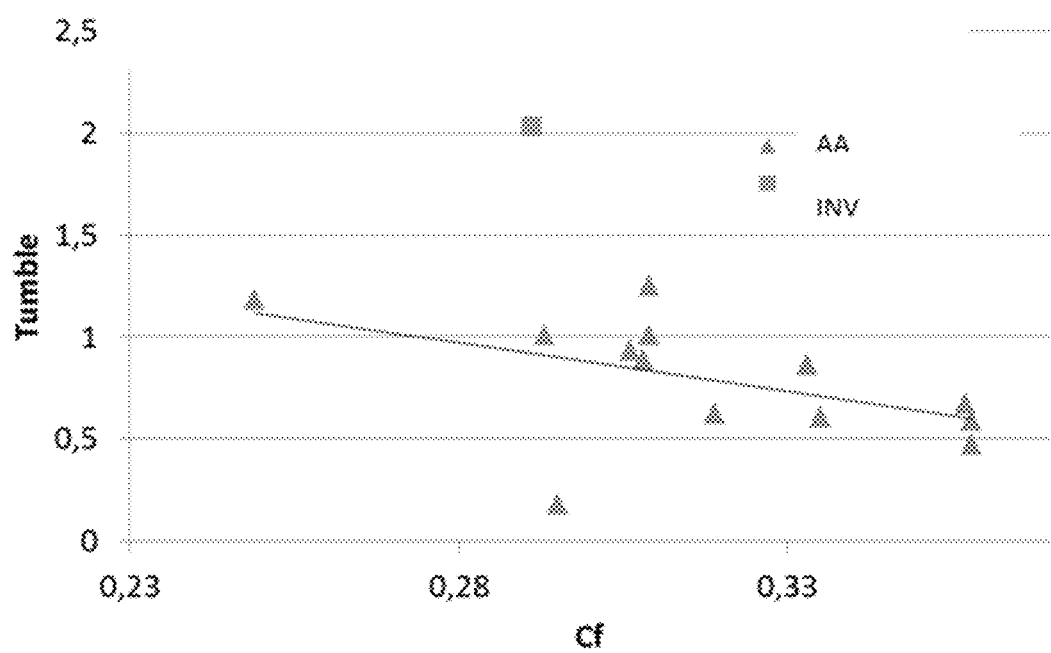

GAS INTAKE DEVICE HAVING TWO ASYMMETRICAL INTAKE DUCTS

CROSS-REFERENCE TO RELATED APPLICATIONS

This application is a U.S. national phase application filed under 35 U.S.C. § 371 of International Application No. PCT/EP2020/058559, filed Mar. 26, 2020, designating the United States, which claims priority from French Patent Application No. 19/04.026 filed Apr. 16, 2019, which are hereby incorporated herein by reference in their entirety for all purposes.

FIELD OF THE INVENTION

The present invention relates to the field of gas intake devices for an internal-combustion engine. In particular, the present invention relates to gas intake devices with two intake pipes allowing an aerodynamic gas motion to be generated in the engine cylinder.

This type of engine generally comprises at least one cylinder, a piston sliding in this cylinder in a reciprocating rectilinear motion, intake means for feeding an oxidizer into the cylinder, exhaust means for discharging the burnt gas from the cylinder, a combustion chamber and injection means for injecting fuel into the cylinder.

As is generally admitted, when designing an engine, the performance and pollutant emission constraints are increasingly high, therefore new solutions need to be found to increase the final engine efficiency.

Increasing combustion efficiency thus is a key point to limit emissions for equal or greater performance. It is therefore of great importance that all of the fuel present in the combustion chamber be used by an oxidizer comprising for example air at ambient pressure, supercharged air, or a mixture of air (supercharged or not) and of recirculated burnt gas.

Indeed, the fuel mixture (oxidizer/fuel) in the combustion chamber needs to be as homogeneous as possible.

Furthermore, in order to ensure good efficiency and combustion rate, it is desirable to have a high turbulence level, and more specifically a high turbulent kinetic energy level, upon ignition of the fuel mixture and during the subsequent combustion.

This high turbulence level can be obtained by means of particular intake aerodynamics, swumble. This type of aerodynamics is characterized in that the macroscopic motion of the fuel mixture is a combination of swirl (rotational motion of the gas in the cylinder about a vertical cylinder axis) and tumble (rotational motion of the gas in the cylinder about a longitudinal engine axis).

Swirl, which is a macroscopic rotational motion of the fuel mixture about an axis collinear to the cylinder axis, is characterized by good motion conservation during the intake process, and more specifically during the rise of the piston. It is an aerodynamic macroscopic motion that is generally used for compression-ignition internal-combustion engines, for which it is a good way to homogenize the fuel mixture.

Tumble is also a macroscopic rotational motion of the fuel mixture, but about an axis globally perpendicular to the cylinder axis. It has the specific feature of turning into microscopic aerodynamic motions that create turbulence as the piston rises. It is an aerodynamic macroscopic motion that is generally used for spark-ignition internal-combustion engines, for which it is a good way to obtain a suitable combustion rate.

Besides, this motion is quite sensitive to the combustion chamber geometry and to the lift law, in terms of spread as well as maximum lift height.

Using swumble allows to benefit from the advantages of the two aerodynamic structures detailed above and thus from excellent homogenization and a better combustion rate, thanks to a higher turbulence level during the compression phase than the levels observed with the best current spark-ignition engines.

BACKGROUND OF THE INVENTION

Various technical solutions have been developed to achieve these turbulent flows in the cylinder.

A first solution is notably described in U.S. Pat. No. 6,606,975. This solution consists in controlling a flap arranged in the intake pipe so as to generate turbulence. This patent further mentions the notion of low load swumble. Such a solution is complex and penalizing as regards cylinder filling.

A second solution is notably described in U.S. Pat. No. 5,056,486. This solution provides a definition of asymmetrical intake pipes allowing complex aerodynamics to be generated. However, this solution requires phase shift of the intake valves opening, which is penalizing at high loads.

A third solution is notably described in patent applications DE-10,128,500 and EP-1,783,341. This solution allows complex aerodynamics to be generated by means of passive or active appendages in the intake pipe. In both cases, these appendages limit cylinder filing with gas. Furthermore, active appendages require a control system making the solution more complex.

A fourth solution is notably described in patent applications US-2008/0,149,063, JP-2010/261,314 and US-2012/160,198. This solution consists in generating aerodynamic motions of the gas in the cylinder by means of masks arranged at the end of the intake pipe. However, to obtain an aerodynamic gas motion of swumble type, it appears necessary to use two masks per intake pipe or to use specific valve lift laws, which makes this solution complex. Furthermore, the masks used limit filing of the cylinder with gas.

Furthermore, internal-combustion engines whose cylinders are provided with two intake pipes or siamese pipes are common (in other words, cylinders with two intake valves). Conventionally, these cylinders can also be provided with two exhaust pipes and two exhaust valves, they are then referred to as four-valve engines. In relation to the configuration with two valves per cylinder, the slightest mechanical inertia of a four-valve engine resulting from the lightening of the moving parts enables higher engine speeds, thus providing higher efficiency and power of the internal-combustion engine.

SUMMARY OF THE INVENTION

The purpose of the invention is to overcome these drawbacks by means of an intake device allowing to obtain, in a simple manner, good engine performances, notably with high turbulent energy and an aerodynamic structure of the gas of swumble type suitably oriented in the cylinder. The present invention therefore relates to a gas intake device for a cylinder of an internal-combustion engine. The gas intake device comprises two intake pipes, two intake valves, two intake valve calibration parts and, in each intake pipe, means for forming an aerodynamic motion of the gas of tumble type in the cylinder. Furthermore, for each intake pipe, the intersection between the intake pipe and the calibration part occurs along a line non-parallel to the plane of the fire face. This inclination allows an aerodynamic motion of swirl type to be generated in the cylinder, which combines with the tumble so as to form an aerodynamic motion of swumble type. Moreover, the inclination angle of this intersection is different for each pipe. Thus, this dissymmetry of the two intake pipes allows to generate an aerodynamic gas motion of swumble type in the cylinder, with a conformation closer to the aerodynamic gas motion of tumble type at the end of compression, which maximizes the creation of turbulent kinetic energy.

The invention relates to a gas intake device for a cylinder of an internal-combustion engine, said gas intake device comprising two intake pipes, an intake valve arranged in each intake pipe, a valve calibration part arranged at one end of each intake pipe and directed at the fire face of said cylinder, and, within each intake pipe, means for generating an aerodynamic motion of said gas within said cylinder about an axis substantially perpendicular to the axis of said cylinder, wherein, at the intrados of each one of said two intake pipes, the intersection between each intake pipe and said calibration part forms a line segment carried by a rectilinear generatrix forming an angle α ranging between 0° and 45° with respect to a plane parallel to said fire face of said cylinder passing through a point of intersection between said intake pipe and said calibration part. Said angles α of said two intake pipes are distinct.

According to one embodiment, the difference between said angles α of said two intake pipes is a non-zero angle δ ranging between 0° and 45°, preferably between 0° and 15°, and more preferably between 1° and 15°.

According to one implementation, said intake pipe for which angle α is the greater is the intake pipe generating the aerodynamic gas motion in the cylinder whose direction is the closest to the axis of said cylinder.

According to one aspect, said angle α of said two intake pipes ranges between 0° and 20°, preferably between 0° and 16°.

Preferably, said angle α is non-zero for said two intake pipes.

According to an embodiment option, said means for generating an aerodynamic gas motion within said cylinder about an axis substantially perpendicular to the axis of said cylinder are comprised of the shape of each of said two intake pipes, notably by means of a ramp shape, and/or of a convergence of the cross-sectional area of said two intake pipes, and/or of an inclination of said two intake pipes.

Advantageously, said two intake pipes form a siamese intake pipe comprising two gas outlets to said cylinder and two intake valves.

According to one implementation, each one of said two intake pipes comprises a mask partly closing said two intake pipes.

According to one embodiment, said two intake pipes are substantially parallel.

Furthermore, the invention relates to an internal-combustion engine comprising at least one cylinder provided with at least one intake device according to one of the above features, at least one exhaust device and fuel injection means.

BRIEF DESCRIPTION OF THE FIGURES

Other features and advantages of the device according to the invention will be clear from reading the description hereafter, given by way of non limitative example, with reference to the accompanying figures wherein:

FIG. 1 illustrates an intake device according to an embodiment of the invention in its operating position, FIG. 2 illustrates views of the intrados of an intake pipe of a gas intake device according to the prior art and to an embodiment of the invention respectively, in its operating position, FIG. 3 illustrates views of the intrados of a gas intake device in its operating position according to an embodiment of the invention, FIG. 4 illustrates a top view of a cylinder equipped with a gas intake device in its operating position according to an embodiment of the invention, FIG. 5 illustrates two tumble curves as a function of the crank angle degree (CAD), one for an intake pipe according to the invention and the other for an intake pipe according to an embodiment that is not according to the invention, FIG. 6 illustrates two turbulent kinetic energy curves as a function of the crank angle degree, one for an intake pipe according to the invention and the other for an intake pipe according to an embodiment that is not according to the invention, and FIG. 7 is a graph of the tumble-permeability compromise for intake devices according to the prior art and for the intake device according to the invention.

DETAILED DESCRIPTION OF THE INVENTION

The present invention relates to a gas intake device for a cylinder of an internal-combustion engine. It is an intake device with two intake pipes.

The gas intake device comprises:
two gas intake pipes for allowing a gas into a cylinder,
an intake valve inserted in each intake pipe, opening of the valve allowing the gas to be fed into the cylinder,
an intake valve calibration part arranged at the end of each intake valve on the cylinder side, the calibration part being directed at the fire face of the cylinder, the intake valve calibration part being a substantially cylindrical mechanical part in which the valve moves,
within each intake pipe, gas diversion means for generating an aerodynamic gas motion within the cylinder in a direction perpendicular to the cylinder axis, in other words, means for forming an aerodynamic gas motion of tumble type.

The fire face or combustion face is understood to be the lower plane of the cylinder head (of the internal-combustion engine) orthogonal to the cylinder axis. The valve calibration part is inserted in the lower plane of the cylinder head so as to supply gas to the cylinder.

In relation to the configuration with one intake valve per cylinder, the slightest mechanical inertia of an engine with two intake valves per cylinder resulting from the lightening of the moving parts enables higher engine speeds, thus providing higher efficiency and power of the internal-combustion engine.

According to the invention, the intake device is formed in such a way that, at the intrados of each intake pipe, the intersection between the intake pipe and the valve calibration part forms a line segment carried by a rectilinear generatrix forming an angle α ranging between 0° and 45° with respect to a plane parallel to the fire face and passing through a point of intersection between the intake pipe and the valve calibration part. The intrados of the intake pipe is understood to be the lower face of the intake pipe (when the intake pipe is in its operating position). Thus, the intersec- tion (which is a line segment) of the lower face of the intake pipe and of the valve calibration part is inclined with respect to a plane parallel to the fire face. This inclination provides diversion of the gas at the calibration part inlet and, a fortiori, at the cylinder inlet. This gas diversion generates an aerodynamic gas motion in the cylinder in a direction parallel to the cylinder axis, in other words, an aerodynamic gas motion of swirl type. This inclination can result in a rotation of the intake pipe at the end thereof (the end of the intake pipe is then twisted), which promotes the aerodynamic gas motion of swirl type. Moreover, this embodiment provides an aerodynamic gas motion of swirl type without any particular appendage (appendix) of mask, flap or blade type. Furthermore, the architecture of this intake device involves no additional constraint for arrangement within a cylinder head of a single-cylinder or multi-cylinder internal-combustion engine.

The inclination at an angle α ranging between 0° and 45° allows a swirl type aerodynamic gas motion to be generated. Above 45°, the geometry of the intake pipe is complex and difficult to achieve.

By combining aerodynamic gas motions of tumble type and swirl type, the gas intake device according to the invention provides a swumble type aerodynamic motion of the gas in the cylinder, which allows to benefit from excellent homogenization and a better combustion rate thanks to a higher turbulence level during the compression phase than those observed with the best current spark-ignition engines.

According to an aspect of the invention, the cross-sectional area of the intake pipe can have a substantially rectangular shape with rounded corners. In this case, the intersection of the intake pipe and the valve calibration part consists of four edges: one on the intrados side, one on the extrados and two lateral edges.

According to one example of this embodiment, the rectangular cross-sectional area of the intake pipe at the intersection with the valve calibration part is inclined with respect to the direction of the fire face. In other words, none of the edges of the rectangular cross-sectional area is parallel or perpendicular to a plane parallel to the fire face.

According to the invention, the two intake pipes are dissymmetrical. The angles α of each intake pipe are distinct. In other words, the generatrices formed by the intersection between the calibration part and the intrados of the two intake pipes are not parallel. This dissymmetry provides good orientation of the aerodynamic gas motion of swumble type in the cylinder, in particular at the end of compression: the aerodynamic gas motion has a conformation that is closer to the aerodynamic gas motion of tumble type, which maximizes the creation of turbulent kinetic energy. Furthermore, the architecture of the intake device according to the invention involves no additional constraint for arrangement within a cylinder head of an engine, which provides a notable advantage by comparison with the current solutions allowing a swumble type aerodynamic gas motion to be obtained.

Preferably, the two pipes can be substantially parallel.

Advantageously, the two pipes can comprise identical means for generating an aerodynamic motion of tumble type.

These two features facilitate the design of the gas intake device in the cylinder.

According to one embodiment of the invention, the difference δ between the angles α of the two intake pipes can be a non-zero angle ranging between 0° and 45°, preferably between 0° and 15°, and more preferably between 1° and 15°. These angle ranges allow the proper orientation of the aerodynamic gas motion of swumble type in the cylinder to be optimized.

According to one implementation of the invention, the intake pipe that is inclined with the greater angle α is the intake pipe generating the aerodynamic gas motion in the cylinder whose direction is closer to the axis (the centre) of the cylinder. This intake pipe can then be referred to as inner pipe and the second intake pipe can then be referred to as outer pipe. In other words, the intake pipe whose aerodynamic gas motion at the outlet is close to the cylinder axis is inclined at an angle α greater than angle α of the intake pipe whose aerodynamic gas motion at the outlet is close to a wall of the cylinder. Thus, the inner pipe generates a greater swirl type aerodynamic motion than the outer pipe, and the outer pipe generates an aerodynamic gas motion closer to a tumble type aerodynamic motion. However, the cylinder wall (close to the outer pipe) wraps and redirects the aerodynamic gas motion from the outer pipe towards the cylinder axis, and it adds up to the aerodynamic gas motion of swumble type. Therefore, the gas stream from the inner pipe strongly turns the flow into an aerodynamic gas motion of swumble type. This configuration provides a significant turbulence gain within the cylinder at top dead centre in relation to a symmetrical intake pipe configuration, thereby enabling a combustion efficiency gain.

The gas is an oxidizer or a fuel mixture (indirect injection), and it can notably comprise air at ambient pressure, supercharged air, or a mixture of air (supercharged or not) and burnt gas.

According to one embodiment of the invention, angle α can range between 0° and 20°, and preferably between 0° and 16°. The angle ranges allow to optimize the aerodynamic gas motion of swirl type and thereby to optimize the combined aerodynamic gas motions of swumble type. Due to the angle difference of the two inclinations, at least one angle α of an intake pipe is non-zero. Preferably, the angle α of at least one intake pipe is greater than or equal to 5°. Below 5°, the inclination is not sufficient to have a significant influence on the aerodynamic gas motion in the cylinder.

According to a preferred embodiment, angle α can be non-zero for both intake pipes. This embodiment allows a greater aerodynamic gas motion of swumble type to be generated.

Preferably, angle δ ranges between 0° and the highest value of angle α between the two pipes (bounds excluded). In other words, we can write the inequality $0<\delta<\alpha_{max}$, with $\alpha_{max}$ the greatest value between the two pipes.

According to one implementation of the invention, the gas diversion means may only consist in the shape of the intake pipe. Thus, no active or passive element impedes the gas flow in the intake pipe.

According to a first example embodiment, the gas diversion means can comprise a ramp shape on the lower profile of each intake pipe. This ramp shape can be obtained through a variation in concavity of the lower profile of the intake pipe. The ramp shape promotes detachment of the gas stream in the intake pipe and sends it to the upper part of the intake pipe, therefore the upper part of the cylinder, so as to maximize the aerodynamic gas motion of tumble type.

According to a second example embodiment (that may be combined with the first example embodiment), the gas diversion means can comprise a convergence of the cross-sectional area close to the valve calibration part. In other words, the cross-sectional area of each intake pipe narrows at its end close to the valve calibration part. This convergence generates a gas flow acceleration that promotes both filing and aerodynamic gas motion.

According to a third example embodiment (that may be combined with the first and/or the second example embodiment), the gas diversion means can comprise an inclination of each intake pipe. This inclination of each intake pipe can be defined by an angle of tangent to the point of intersection of the intake pipe with the calibration part ranging between 0° and 45°. This inclination can be coupled with the slope of the upper part of the combustion chamber of the cylinder. The inclination of the intake pipe allows the gas stream entering the cylinder to be inclined so as to form an aerodynamic gas motion of tumble type. For example, an optimization of the aerodynamic gas motion of tumble type can be achieved with a tangency between the angle of the intake pipe and the angle of the slope of the upper part of the combustion chamber.

According to one aspect of the invention, each intake pipe can comprise an intake mask partly closing the end of the intake pipe opening into the cylinder. An intake mask is defined as a specific combustion chamber machining close to the intake valve seats, which allows to block the passage over part of the cross-sectional area of the intake pipe, at the seat, in order to accelerate the gas flow and thereby to increase the turbulence in the combustion chamber.

According to one aspect of the invention, the gas intake device can be of siamese type. In other words, the siamese intake pipe comprises a single inlet and two outlets directed at the cylinder, each outlet comprising an intake valve and an intake valve calibration part. The siamese intake pipe consists of two intake pipes having the features described above for generating an aerodynamic gas motion of swumble type in the cylinder. This type of siamese intake device, suited to cylinders with two intake valves, allows the design of the intake plenum (the intake plenum is the volume upstream from the intake pipes) to be simplified.

FIG. 1 schematically illustrates, by way of non limitative example, an intake device 1 according to an embodiment of the invention. FIG. 1 is a side view of the operation of intake device 1. Only one intake pipe 5 is illustrated in this figure since the two intake pipes are substantially parallel and distant in a direction perpendicular to the plane of the figure. Intake device 1 comprises an intake pipe 5, a valve 4 in the intake pipe and an intake valve calibration part 6. The end of intake valve 4 providing passage of the gas for its opening is not shown. Intake pipe 5 comprises a gas inlet 2 and a gas outlet 3 in which intake valve 4 and its calibration part 6 are arranged.

Intake device 1 further comprises gas diversion means for generating an aerodynamic motion of the gas within the cylinder in a direction perpendicular to the cylinder axis (aerodynamic gas motion of tumble type). These gas diversion means comprise a convergence 8 of the cross-sectional area of intake pipe 5 close to calibration part 6 of the valve. This convergence 8 corresponds to a decrease in the cross-sectional area close to calibration part 6 of the valve. Furthermore, the gas diversion means comprise a ramp 9 provided on the lower profile of intake pipe 5 through a concavity variation of the lower profile of intake pipe 5. Moreover, the gas diversion means comprise the inclination of intake pipe 5 defined by the tangent to point of intersection 7 of intake pipe 5 with calibration part 6, and a direction AA. This figure also shows a line FF belonging to the plane of the fire face. Direction AA is parallel to line FF and it allows to define the inclination of intake pipe 5.

FIG. 2 schematically illustrates, by way of non-limitative example, partial views of the intrados (lower face) of an intake pipe. FIG. 2 is in a plane perpendicular to the fire face (in the operating position of the intake device). The figure on the left corresponds to a pipe according to the prior art without gas diversion means for generating an aerodynamic gas motion of swirl type. The figure on the right corresponds to a device according to a variant of the invention with, at the intrados, an inclination of the intersection between the intake pipe and the valve calibration part for generating an aerodynamic gas motion of swirl type. For the embodiment illustrated, the (intake) pipe section is substantially rectangular.

In these figures, line FF belongs to the plane of the fire face (defined by the cylinder, not shown), and direction F'F' is a line belonging to a plane parallel to fire face FF passing through a point of intersection between intake pipe 5 and intake valve calibration part 6.

According to the prior art illustrated in the left figure, intersection 7 between intake pipe 5 and intake valve calibration part 6 is a line segment merging with line F'F'.

On the other hand, according to the invention illustrated in the right figure, intersection 7 between intake pipe 5 and intake valve calibration part 6 forms a line segment carried by a rectilinear generatrix of axis YY inclined at an angle α with respect to plane F'F'. This non-zero angle α ranges between 0° and 45°. It can be seen in the right figure that this inclination generates, close to the intersection with the valve calibration part, a sight rotation of intake pipe 5, which has a substantially rectangular cross-sectional area.

FIG. 3 schematically illustrates, by way of non-imitative example, a partial view of the intrados (lower face) of an intake device 1 according to an embodiment of the invention. FIG. 3 is in a plane perpendicular to the fire face (in the operating position of the intake device). Intake device 1 comprises a first intake pipe 5 and a second intake pipe 5b. The two intake pipes 5 and 5b are substantially parallel. A calibration part 6a is provided at the end of first intake pipe 5o, and a calibration part 6b is provided at the end of second intake pipe 5b.

In this figure, line FF belongs to the plane of the fire face (defined by the cylinder, not shown), and direction F'F' is a line belonging to a plane parallel to fire face FF passing through a point of intersection between intake pipes 5a and 5b and calibration parts 6a and 6b of the intake valve.

Intersection 7a between first intake pipe 5a and calibration part 6a of the intake pipe forms a line segment carried by a generatrix YaYa inclined at an angle α1 with respect to plane F'F'. Intersection 7b between second intake pipe 5b and calibration part 6b of the intake valve forms a line segment carried by a generatrix YbYb inclined at an angle α2 with respect to plane F'F', angle α2 being strictly less than angle α1. The (non-zero) angular difference δ between generatrices YaYa and YbYb is denoted by δ, which ranges between 0° and 45°, preferably between 0° and 15°.

FIG. 4 schematically illustrates, by way of non-imitative example, a top view of a cylinder 10 equipped with an intake device according to an embodiment of the invention. The exhaust device is not shown in this figure. The intake device comprises a first intake pipe 5a and a second intake pipe 5b. A calibration part 6a is provided at the end of first intake pipe 5a, it opens into cylinder 10. A calibration part 6b is provided at the end of second intake pipe 5b, it opens into cylinder 10. This figure schematically shows with arrows Ma and Mb the aerodynamic gas motion in the cylinder at the outlet of first intake pipe 5a and of second intake pipe 5b respectively. The aerodynamic gas motion Ma at the outlet of first intake pipe 5a moves close to centre O of the cylinder in the plane of the figure (point O belongs to the cylinder axis) and the aerodynamic gas motion Mb at the outlet of second intake pipe 5b moves close to the cylinder wall. Thus, first intake pipe 5a is the inner pipe of the intake device and second intake pipe 5b is the outer pipe of the intake device. According to one embodiment, angle α of first intake pipe 5a is greater than angle α of second intake pipe 5b. In this case, FIG. 4 is a top view of the intake device of FIG. 3.

The invention also relates to an assembly comprising a cylinder of an internal-combustion engine and an intake device according to one of the variants or variant combinations described above.

Furthermore, the present invention relates to an internal-combustion engine comprising at least one cylinder, each cylinder being provided with:

at least one intake device according to one of the variants or variant combinations described above, for supplying gas to the cylinder, at least one exhaust device for discharging the burnt gas from the cylinder, the exhaust device being advantageously equipped with an exhaust valve, a piston having a reciprocating rectilinear translational motion in the cylinder for generating mechanical energy from the combustion (by rotation of a crankshaft), fuel injection means, for generating combustion.

According to an embodiment, the fuel injection means can be direct injection means, i.e. the fuel injection means are directive arranged in the cylinder.

Alternatively, the fuel injection means can be indirect injection means, i.e. the fuel injection means are arranged in the intake device.

According to an implementation of the invention, the internal-combustion engine is a spark-ignition engine. In this case, the engine further comprises at least one plug for generating combustion of the gas/fuel mixture.

Alternatively, the internal-combustion engine is a compression-ignition engine. In this case, the engine comprises no plug for generating combustion of the gas/fuel mixture.

The internal-combustion engine can comprise a plurality of cylinders, notably 3, 4, 5 or 6 cylinders.

Preferably, the combustion engine can be an engine with four valves per cylinder (two intake valves and two exhaust valves).

Moreover, the present invention relates to the use of an internal-combustion engine according to one of the variants or variant combinations described above according to a Miller cycle or an Atkinson cycle.

The Atkinson cycle is the standard thermodynamic cycle used in variable-combustion engines.

The Miller cycle is a thermodynamic cycle characterized by an intake valve closure before the bottom dead centre of the piston during the intake phase. This provides increased work recovery, in addition to cooling of the charge admitted. The intake device according to the invention is particularly suited for use in a so-called Miller cycle over a wide operating range, thanks to the generation of a swumble type aerodynamic gas motion.

FIG. 7 is a graph of the tumble coefficient as a function of a permeability coefficient Cf for a Miller cycle. The tumble coefficient is defined as the ratio of the angular speed of the gas around the centre of mass in direction x (direction perpendicular to the cylinder axis) to the angular speed of the crankshaft, and the permeability coefficient corresponds to the ability of the intake pipe to allow an air stream to pass through with respect to the available cross-sectional area. The permeability coefficient is thus related to the cylinder filling. In the figure, the intake pipes available on the market AA (according to the prior art) are represented by triangles and the intake device according to the invention INV is represented by a square. It appears that the intake device according to the invention INV provides a better compromise between a high tumble coefficient and the permeability coefficient than the solutions from the prior art AA. Indeed, for an identical permeability coefficient Cf, the tumble coefficient obtained with the intake pipe according to the invention is twice that of the intake pipe according to the prior art.

The internal-combustion engine according to the invention can be used in the field of embedded applications, such as road, sea or air transport, or in the field of stationary installations such as a generator set.

The invention is of course not limited to the intake device embodiments described above by way of example, and it encompasses any variant embodiments.

Examples

The features and advantages of the method according to the invention will be clear from reading the comparative example hereafter.

For this comparative example, we compare two intake devices comprising each two substantially parallel intake pipes with identical means for generating an aerodynamic gas motion of tumble type and distinct means for generating an aerodynamic gas motion of swirl type. Indeed, the first intake device, not according to the invention, comprises two symmetrical intake pipes with identical angles α, and the second intake device, according to the invention, comprises two dissymmetrical intake pipes with distinct angles α, in such a way that angle α1 of the inner pipe is greater than angle α2 of the outer pipe. For the comparative example, angle α1 has the same value as angle α of the example not according to the invention, and angle α2 is zero.

FIG. 5 shows the tumble number T for each intake type as a function of the crank angle degree CAD. The tumble number in a direction x is defined as the ratio of the angular speed of the gas around the centre of mass in direction x (perpendicular to the cylinder axis) to the angular speed of the crankshaft. The tumble number is a dimensionless number. The curve relative to the intake device not according to the invention is denoted by NC and the curve relative to the device according to an embodiment of the invention is denoted by INV. The bottom figure is a zoom of the top figure for a CAD range between 600 and 740. A tumble number gain is observed for the intake device according to the invention in relation to the intake device not according to the invention.

FIG. 6 shows the turbulent kinetic energy TKE for each intake type as a function of crank angle degree CAD. The turbulent kinetic energy TKE represents the amount of energy "entrapped" in the air mass. The curve relative to the intake device not according to the invention is denoted by NC and the curve relative to the intake device according to an embodiment of the invention is denoted by INV. The bottom figure is a zoom of the top figure for a CAD range between 600 and 740. A turbulent kinetic energy gain is observed close to the top dead centre. This reflects a better flow energy conservation and better conversion to turbulent kinetic energy at the end of compression close to the top dead centre, specifically for operation in an advanced Miller cycle.

Thus, significant combustion efficiency gains are obtained using intake pipes according to the invention.

The invention claimed is:

1. A gas intake device for a cylinder of an internal-combustion engine, the gas intake device comprising two intake pipes, an intake valve arranged in each intake pipe, a valve calibration part arranged at one end of each intake pipe and directed at the fire face of the cylinder, and, within each intake pipe, means for generating an aerodynamic motion of the gas within the cylinder about an axis substantially perpendicular to the axis of the cylinder, the means for generating an aerodynamic gas motion within the cylinder about an axis substantially perpendicular to the axis of the cylinder being comprised of the shape of each of the two intake pipes, and/or of a convergence of the cross-sectional area of the two intake pipes, and/or of an inclination of the two intake pipes, wherein, at the intrados of each one of the two intake pipes, the intersection between each intake pipe and the calibration part forms a line segment carried by a rectilinear generatrix forming an angle α ranging between 0° and 45° with respect to a plane parallel to the fire face of the cylinder passing through a point of intersection between the intake pipe and the calibration part, characterized in that the angles α of the two intake pipes are distinct.

2. An intake device as claimed in claim 1, wherein the difference between the angles α of the two intake pipes is a non-zero angle δ ranging between 0° and 45°.

3. An intake device as claimed in claim 1, wherein the intake pipe for which angle α is the greater is the intake pipe generating the aerodynamic gas motion in the cylinder whose direction is the closest to axis of the cylinder.

4. An intake device as claimed in claim 1, wherein the angle α of the two intake pipes ranges between 0° and 20°.

5. An intake device as claimed in claim 1, wherein the angle α is non-zero for the two intake pipes.

6. An intake device as claimed in claim 1, wherein the means for generating an aerodynamic gas motion within the cylinder about an axis substantially perpendicular to the axis of the cylinder a ramp shape of each of the two intake pipes.

7. An intake device as claimed in claim 1, wherein the two intake pipes form a siamese intake pipe comprising two gas outlets to the cylinder and two intake valves.

8. An intake device as claimed in claim 1, wherein each one of the two intake pipes comprises a mask partly closing the two intake pipes.

9. An intake device as claimed in claim 1, wherein the two intake pipes are substantially parallel.

10. An internal-combustion engine comprising at least one cylinder provided with at least one intake device as claimed in claim 1, at least one exhaust device and fuel injection means.

11. An intake device as claimed in claim 1, wherein the difference between the angles α of the two intake pipes is a non-zero angle δ ranging between 0° and 15°.

12. An intake device as claimed in claim 1, wherein the difference between the angles α of the two intake pipes is a non-zero angle δ ranging between 1° and 15°.

13. An intake device as claimed in claim 1, wherein the angle α of the two intake pipes ranges between 0° and 16°.

* * * * *